W. ELVIS.
KITCHEN COMMODES.
No. 183,385. Patented Oct. 17, 1876.
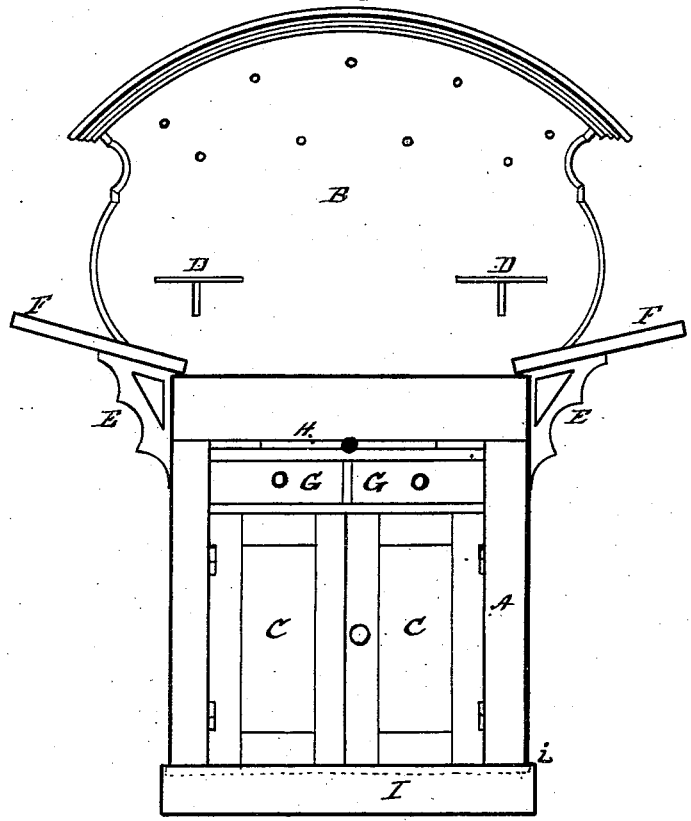
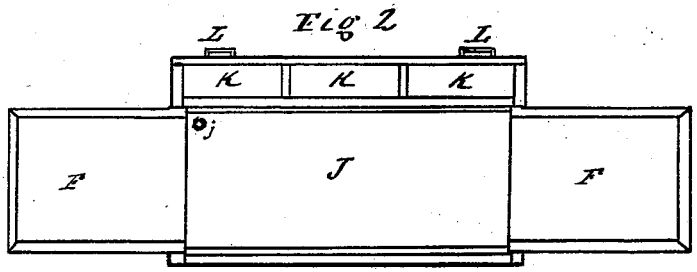
Witnesses—
David G. Abrams.
Will H. Moxon
Inventor—
Wm Elvis
per attys.
A. H. Evans & Co.

UNITED STATES PATENT OFFICE.

WILLIAM ELVIS, OF INDIANAPOLIS, INDIANA, ASSIGNOR OF ONE-HALF HIS RIGHT TO JOHN W. JOHNSON.

IMPROVEMENT IN KITCHEN-COMMODES.

Specification forming part of Letters Patent No. 183,385, dated October 17, 1876; application filed August 22, 1876.

*To all whom it may concern:*

Be it known that I, WILLIAM ELVIS, a resident of Indianapolis, county of Marion, State of Indiana, have invented certain new and useful Improvements in Kitchen-Commodes, of which the following is a full, clear, and exact description, reference being had to the accompanying drawings, making a part of this specification.

Figure 1 is a front view of my kitchen-commode. Fig. 2 is a view of the top, representing the sink, soap, and scouring boxes, and waste-pipe. Fig. 3 represents a section of base with groove or receptacle.

The object of my invention is to provide a simple and cheap commode for kitchen use, and one which cannot be entered by ants and other insects; and it consists in the combination of devices hereinafter explained and claimed.

To enable others to make and use my invention, I will proceed to state the exact manner in which I have carried it out.

In the drawings, A represents the body of the commode, and C C the doors of the cupboard in the lower portion. B is a detachable sideboard, provided with the shelves D D, and with hooks or knobs for suspending kitchen utensils. In the upper portion of the commode I construct the sink or washing-basin J, provided with the discharge-pipe $j$. The top of the commode forms the cover for the sink, and is constructed in two parts, F F, hinged at the sides and opening outward, and when open resting on the brackets E E. In the rear of the doors and sink I construct the compartments K K, for the reception of soap, brushes, and other similar articles, and these receptacles are protected by a hinged lid. In the rear of the top portion of the commode I secure the sockets L L for securing the sideboard B, which is provided with corresponding tenons fitting into these sockets, so that the board can be readily detached from the rest of the commode at any time for the purpose of cleaning or removal.

I am aware that it is not new to attach backs or screens to wash-stands, but I am not aware that these have been made detachable.

Around the entire body of the commode at its lowest point I construct a groove, $i$. (Shown in dotted lines on Fig. 1.) This groove is designed to be filled with any kind of suitable liquid, to prevent ants and other insects from reaching the interior of the commode. Heretofore these grooves or other protective devices have been placed only around the feet or legs of commodes, which is objectionable, as the ants are liable to reach the main bottom of the cupboard should any article be accidentally left lying in contact with the base.

Having thus explained my invention, what I claim as new, and desire to secure by Letters Patent, is—

A kitchen-commode constructed as described, and consisting of the body A, provided with the groove $i$ entirely around its base, and having a cupboard in the lower portion with a sink and drain-pipe, and small receptacles K K above, covered by the folding top F F, and a detachable sideboard, B, all constructed to operate substantially as and for the purpose set forth.

WILLIAM ELVIS.

Witnesses:
JAMES P. SMITH,
W. H. CLINE.